Jan. 6, 1925. 1,521,612
S. FREEDMAN
DEVICE FOR FILLING TIRES WITH LIQUIDS
Filed June 19, 1924
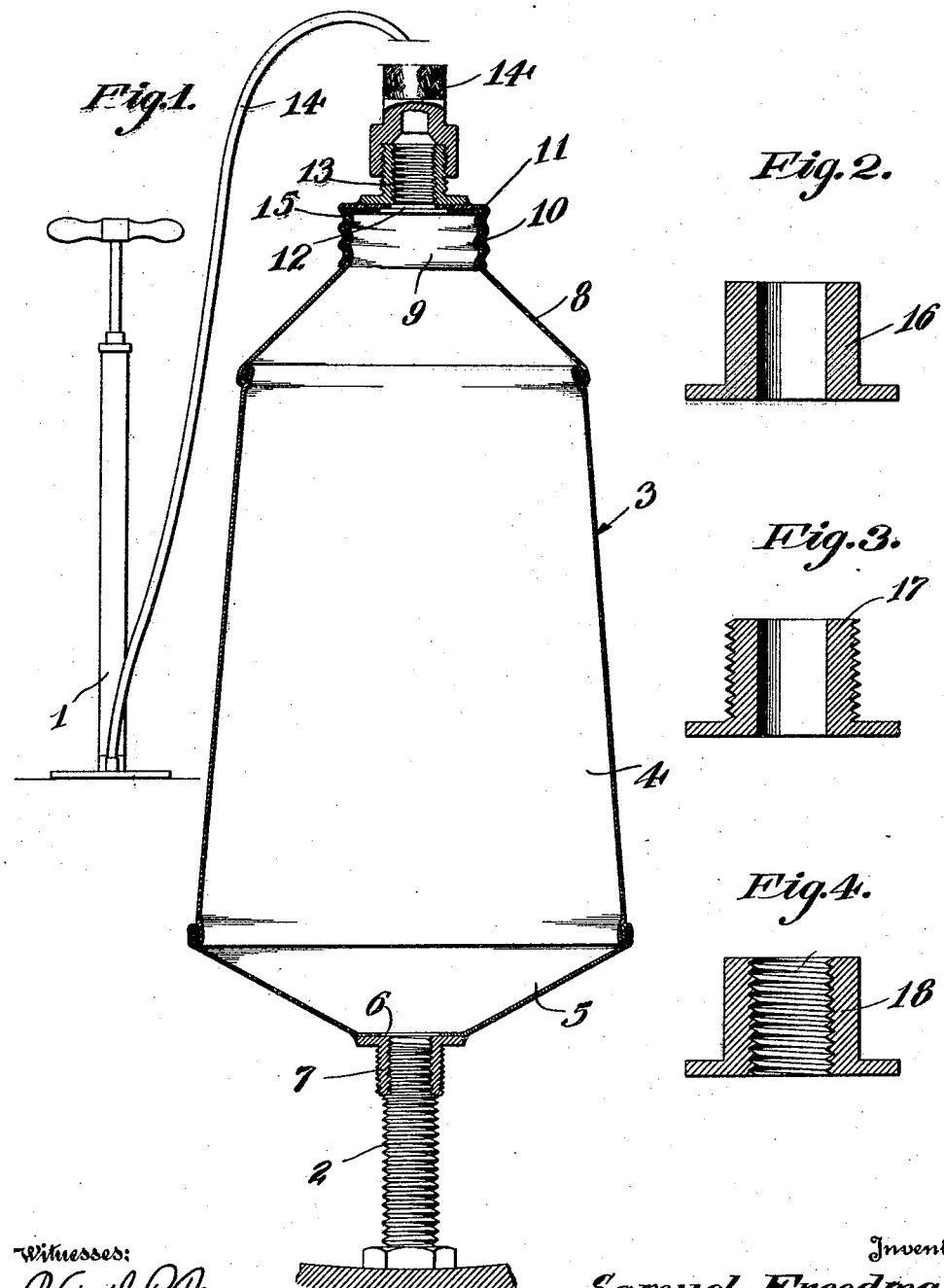

Patented Jan. 6, 1925.

1,521,612

UNITED STATES PATENT OFFICE.

SAMUEL FREEDMAN, OF PHILADELPHIA, PENNSYLVANIA.

DEVICE FOR FILLING TIRES WITH LIQUIDS.

Application filed June 19, 1924. Serial No. 720,952.

*To all whom it may concern:*

Be it known that I, SAMUEL FREEDMAN, a citizen of the United States, residing at Philadelphia, in the county of Philadelphia and State of Pennsylvania, have invented certain new and useful Improvements in Devices for Filling Tires with Liquids, of which the following is a specification.

My invention relates to devices for filling tires with liquids and is especially designed for use with viscous liquids such as puncture proof compounds.

The objects are to provide a device of simple and durable construction with which a liquid may be quickly forced into a tire; which will discharge all of its contents into the tire; which may be quickly attached to the stem of the tire either on or off the wheel, and which may be conveniently filled and set for forcing the liquid into the tire.

These objects, and other advantageous ends which will be described hereinafter, I attain in the following manner, reference being had to the accompanying drawings in which—

Figure 1 is a central section through my improved device illustrating it attached to the pump and the valve stem of a tire, and Figures 2, 3 and 4 are central sections through modified forms of attaching means which may be used for attaching the device shown in Figure 1 to the pump and valve stem.

Referring to the drawing, 1 indicates a suitable air pump, 2 the valve stem of a tire and 3 my improved device.

The device 3 consists of a tank 4 having a conical bottom 5 provided with a discharge opening 6 in its apex and a nipple 7 secured around the discharge opening for attaching the tank to valve stem 2, and a conical top 8 having a filling opening 9 and a threaded boss 10 surrounding the opening. The walls of the tank preferably converge from the bottom to the top, so that it may fit between the spokes of the wheel. A cap 11, screwed onto the boss for closing the opening, is provided with an air inlet 12. A nipple 13 is secured to cap 11 around the inlet for attaching the tank to the hose 14 of air pump 1. A gasket 15 is preferably placed between the boss and the cap to prevent leakage.

In Figure 2, I have shown a nipple 16 without threads which may be attached to cap 11 and bottom 5. In Figure 3, I have shown a nipple 17 with threads on the outside only. In Figure 4, I have shown a nipple 18 with threads on the inside only. Nipples 17 and 18 may be used instead of nipples 13 and 7.

To force liquid into a tire, nipple 7 is secured to valve stem 2 and the tank filled. Cap 11 is then screwed onto boss 10 and hose 14 is attached to nipple 13. Pump 1 is then operated to force the liquid from the tank through valve stem 2 into the tire. When the level of the liquid reaches the conical bottom its area will become smaller until all of the liquid is forced through discharge opening 6 and valve stem 2 into the tire. If more liquid is desired the cap may be quickly removed and the tank filled again. The tapered contour of the walls of the tank allows it to fit between the spokes of a wheel and the conical top positions the cap between the spokes of a wheel so that it may be conveniently removed and attached.

It will be seen that the device above set forth will quickly force all of its contents into a tire; that it may be quickly attached to a valve stem and that it may be conveniently filled.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described consisting of a tank having a filling opening in its top and a discharge opening in its bottom; conduit attaching means secured to the bottom around the discharge opening, and conduit attaching means detachably secured to the top around the filling opening.

2. A device of the character described consisting of a tank having a conical top provided with a filling opening in its apex, and a conical bottom provided with a discharge opening in its apex; conduit attaching means secured to the bottom around the discharge opening, and conduit attaching means detachably secured to the top around the filling opening.

3. A device of the character described consisting of a tank having a conical top provided with a filling opening in its apex and a conical bottom provided with a discharge opening in its apex; conduit attaching means secured to the bottom around the discharge opening; a cap detachably secured to the top for closing the filling opening and having an air inlet, and a nipple secured to the cap around the inlet.

In testimony whereof I have signed my name to this specification in the presence of two subscribing witnesses.

SAMUEL FREEDMAN.

Witnesses:
HARRY H. GORDON,
E. FREEDMAN.